United States Patent
Friedmann et al.

(10) Patent No.: US 10,585,797 B2
(45) Date of Patent: Mar. 10, 2020

(54) OPERATING DIFFERENT PROCESSOR CACHE LEVELS

(71) Applicant: International Business Machines Corporation, Armonk, NY (US)

(72) Inventors: Simon H. Friedmann, Boeblingen (DE); Christian Jacobi, West Park, NY (US); Markus Kaltenbach, Holzgerlingen (DE); Ulrich Mayer, Weil im Schoenbuch (DE); Anthony Saporito, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/650,124

(22) Filed: Jul. 14, 2017

(65) Prior Publication Data

US 2019/0018769 A1    Jan. 17, 2019

(51) Int. Cl.
*G06F 12/10* (2016.01)
*G06F 12/0811* (2016.01)
*G06F 12/0855* (2016.01)
*G06F 12/0864* (2016.01)

(52) U.S. Cl.
CPC ...... *G06F 12/0811* (2013.01); *G06F 12/0855* (2013.01); *G06F 12/0864* (2013.01); *G06F 2212/1008* (2013.01); *G06F 2212/1021* (2013.01); *G06F 2212/507* (2013.01)

(58) Field of Classification Search
CPC combination set(s) only.
See application file for complete search history.

(56) References Cited

U.S. PATENT DOCUMENTS

| | | | |
|---|---|---|---|
| 5,649,155 A | * | 7/1997 | Krumm .................. G06F 9/34 711/128 |
| 7,509,484 B1 | | 3/2009 | Golla et al. |
| 7,900,024 B2 | | 3/2011 | Abernathy et al. |
| 8,683,129 B2 | | 3/2014 | Ono et al. |
| 8,812,822 B2 | | 8/2014 | Luick |
| 9,009,408 B2 | | 4/2015 | Chachad et al. |
| 9,086,973 B2 | | 7/2015 | Vorbach |
| 9,785,568 B2 | | 10/2017 | Vajapeyam |
| 2003/0154345 A1 | | 8/2003 | Lyon |
| 2009/0217015 A1 | * | 8/2009 | Alexander ............ G06F 9/3804 712/239 |
| 2013/0262770 A1 | | 10/2013 | Ghai et al. |

(Continued)

OTHER PUBLICATIONS

Dean et al., "ProfileMe: Hardware Support for Instruction-Level Profiling on Out-of-Oder Processors," Micro 30 Proceedings of the 30th Annual ACM/IEEE International Symposium on Microarchitecture, Dec. 1997, pp. 1-12.

(Continued)

*Primary Examiner* — Yong J Choe
(74) *Attorney, Agent, or Firm* — Nathan M. Rau

(57) ABSTRACT

A computer implemented method to operate different processor cache levels of a cache hierarchy for a processor with pipelined execution is suggested. The cache hierarchy comprises at least a lower hierarchy level entity and a higher hierarchy level entity. The method comprises: sending a fetch request to the cache hierarchy; detecting a miss event from a lower hierarchy level entity; sending a fetch request to a higher hierarchy level entity; and scheduling at least one write pass.

4 Claims, 5 Drawing Sheets

(56) References Cited

U.S. PATENT DOCUMENTS

2016/0062905 A1  3/2016  Habermann et al.
2018/0349276 A1  12/2018  Toliver et al.

OTHER PUBLICATIONS

Jacobi et al., "Cache Structure Using a Logical Directory," U.S. Appl. No. 15/625,223, filed Jun. 16, 2017.
Friedmann et al., "Operating Different Processor Cache Levels," U.S. Appl. No. 15/856,167, filed Dec. 28, 2017.
List of IBM Patents or Patent Applications Treated as Related, Signed Dec. 28, 2017, 2 pages.
Friedmann et al., "Operating Different Processor Cache Levels," U.S. Appl. No. 15/896,537, filed Feb. 14, 2018.
List of IBM Patents or Patent Applications Treated as Related, Signed Feb. 14, 2018, 2 pages.

* cited by examiner

OPERATING DIFFERENT PROCESSOR CACHE LEVELS

BACKGROUND

The present disclosure relates to operating different processor cache levels of a cache hierarchy, in particular a cache hierarchy intended for use with a processor with pipelined execution. In this concern, saving hardware for tracking level 1 cache misses may be considered.

A cache is a circuitry combined with switching logic that arranged to keep a processor's access time to fetch data from memory, be it data or instruction data, as short as possible. This is required because, in recent years, processor velocity has grown considerably faster than the velocity of accessing memory. Thus, data that has already been fetched from main memory is intermediately stored in a buffer called cache, the cache being arranged very close to the processor and being a very fast though small piece of memory. During further development of increasing processor velocities without correspondingly increasing the velocity of the main memory, further buffer levels were necessary.

Nowadays, several cache levels are spread over a computer system, a level 1 cache being arranged most closely on the processor die. Usually, a processor may comprise a level 1 data cache, a level 1 instruction cache, and a level 2 cache. A level 3 cache and main memory may be distributed over the computer system.

When the processor requires data, be it data as such or instruction data, the processor issues a request for the data. Cache logic arranged on the chip tries first to find the requested in a corresponding level 1 cache, or, L1 cache. This is done via the help of a directory associated with the L1 cache together with, e.g., the information as to whether a referenced data is valid or not.

In the case, the data could not be found or is invalid, a miss event has occurred, meaning that the requested data was missed in the L1 cache. In that case, counters for tracking statistical data may be incremented or decremented, respectively, e.g., a hit counter or a miss counter. Further, a fetch address register, that might be abbreviated in circumstances as FAR, might be filled up with the requested address or parts of it. It is also considered to use another appropriate register. However, for a better comprehensibility, in the following, it will mostly be referred to the fetch address register. Based on this entry, a request to a level 2 cache, L2 cache, may be sent, followed by a similar logic. For example, when an L2 miss event occurs, it will be necessary to issue a further request, now directed to the next higher cache level, i.e., here, the L3 cache. This may repeat, up a cache hierarchy, until the main memory is reached. In this hierarchy, trying to retrieve the necessary data from the main memory, is the ultima ratio.

In the case of a deep pipeline, the feedback as to whether or not the request to the L2 cache as resulted into a hit or a miss, may consume considerable time.

SUMMARY

Various embodiments provide for a computer implemented method to operate different processor cache levels of a cache hierarchy for a processor with pipelined execution, and a corresponding processor and a corresponding computer program product. Advantageous embodiments are described in the dependent claims. Embodiments of the present disclosure can be freely combined with each other if they are not mutually exclusive.

In one aspect, the disclosure relates to a computer implemented method to operate different processor cache levels of a cache hierarchy for a processor with pipelined execution, the cache hierarchy comprising at least a lower hierarchy level entity and a higher hierarchy level entity, the method comprising: sending a fetch request to the cache hierarchy; detecting a miss event from the lower hierarchy level entity; sending a fetch request to the higher hierarchy level entity; and scheduling at least one write pass.

In one aspect, the disclosure relates to a processor having at least a one cache, the cache comprising at least a directory structure for keeping entries written into a memory bank of the cache, and at least a fetch address register, wherein parts of the directory structure are arranged to, at least partially, fulfil a task of the fetch address register.

In a further aspect, the disclosure relates to computer program product to operate different processor cache levels of a cache hierarchy for a processor with pipelined execution, the cache hierarchy comprising at least a lower hierarchy level entity and a higher hierarchy level entity, the computer program product comprising: a computer readable storage medium having computer usable code embodied therewith, wherein the computer readable storage medium is not a transitory signal per se, the computer usable program code comprising: computer usable code configured for sending a fetch request to the cache hierarchy; computer usable code configured for detecting a miss event from a lower hierarchy level entity; computer usable code configured for sending a fetch request to a higher hierarchy level entity; and computer usable code configured for scheduling at least one write pass.

BRIEF DESCRIPTION OF THE DRAWINGS

A detailed description of the disclosure is given in the following drawings in which.

DETAILED DESCRIPTION

Figure 1:
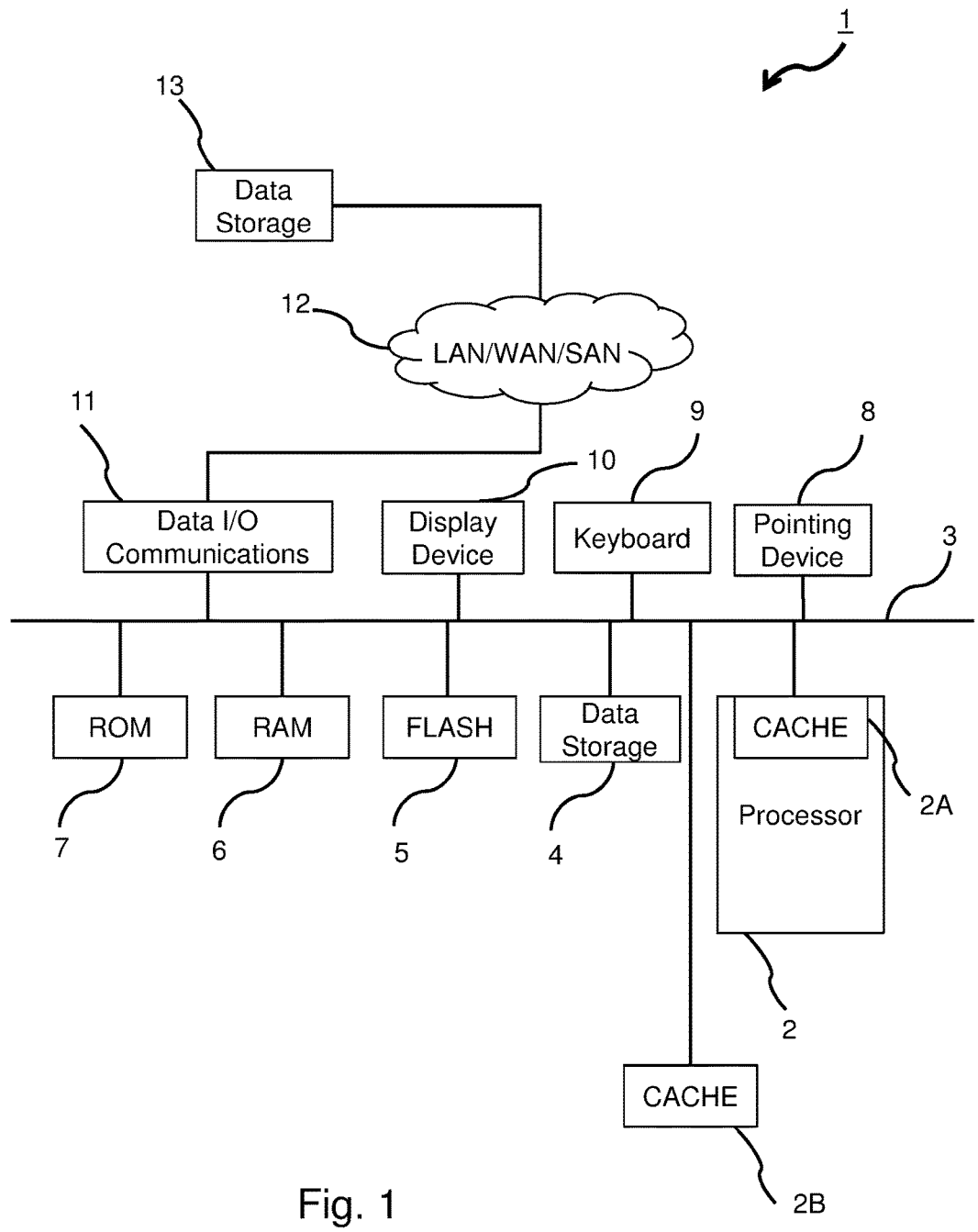
FIG. 1 shows a block diagram of a computer processing system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method as described below, according to a first aspect, may be able to operate different processor cache levels of a cache hierarchy for a processor with pipelined execution, the cache hierarchy comprising at least a lower hierarchy level entity and a higher hierarchy level entity. This may have the advantage that the control logic circuitries concerning the respective different cache levels may cooperate over the different levels in order to minimize a latency. Latency, as used herein, may refer to time elapsed between a request from a processor concerning the contents of a specified memory cell, until the contents is delivered to the requesting processor's core. Cache hierarchy as used herein may mean the different cache and/or memory stages between the processor core and the memory and/or main memory. A hierarchy level entity, in this regard, may mean a cache or memory or main memory within the cache hierarchy. A lower hierarchy level entity may mean a cache or memory that is closer to the core. In an example, a lower hierarchy level entity may mean a L1 cache. A higher hierarchy level entity is a cache or memory or main memory that is farther from the core than the lower hierarchy level entity. For example, in the case, the lower hierarchy level entity is an L1 cache, then, the higher hierarchy level entity might be an L2 cache or memory or already the very main memory. Of course, it might be envisaged that more hierarchy levels are provided. The highest hierarchy level entity, independent of how many levels are provided, will always be the main memory.

The method may further comprise sending a fetch request to the cache hierarchy. A skilled person will understand that a fetch request that is sent by a processor or one of its cores will first be handled by a logic of, e.g., an L1 cache. In the case, a miss occurs, i.e., the requested data is not already stored in the L1 cache, the cache logic will send the request to the cache that is next in the cache hierarchy, i.e. to a higher hierarchy level entity.

The method may further comprise detecting a miss event from the lower hierarchy level entity. The miss event may occur when the requested data is not to be found in, e.g., the L1 cache, or, is marked to be not valid.

The method may further comprise sending a fetch request to the higher hierarchy level entity.

The method may further comprise scheduling at least one write pass. This may have an advantage in that the lower level cache is prepared to receive the data and store it rapidly in its memory bank.

In an embodiment, the scheduling of the at least one write pass comprises writing information into a directory administrating the lower hierarchy level entity. In embodiments, before writing the information into the directory administrating the lower hierarchy level entity, the information might have been previously stored in a fetch address register. In alternative embodiments, a fetch address register might be, at least partially, omitted in the processor and/or cache architecture. Thus, silicium chip area might be saved.

In an embodiment, the scheduling of the at least one write pass is performed without waiting for the reply to the fetch request to the higher hierarchy level entity.

In an embodiment, a third hierarchy level entity is comprised, and the sending the fetch request comprises sending the fetch request to the third hierarchy level entity.

This may have an advantage, in particular with regard to a processor having a deep pipeline, in that both the higher hierarchy level entity and the next higher hierarchy level entity are requested to response with the valid data.

The reason is, that, in a deep pipeline, there may occur several processor clocks until the higher level cache returns with the result, be it a hit or a miss. When the higher level cache returns with a miss, the core has waited for a long time in vain, which may increase an overall latency of the system. In an example, a pipeline might comprise 12 stages, whereas a miss on the higher level cache might be detected after 7 or 8 clocks. This is not acceptable for modern processors.

By sending one and the same request at the same time to both a higher hierarchy level entity and a subsequent higher hierarchy level entity, the latency may be reduced. The skilled person will, thus understand, that, while, e.g., the L2 directory look-up may take place in order to detect hit/miss the same request address might be already sent closer to, e.g., the L3 directories, on the way an arbitration and/or book-keeping would take place. All the efforts on the path to, e.g., L3 may be done speculatively. In case of, e.g., an L2 hit, the L3 request may get cancelled. In case of e.g., L2 miss the L3 request may have a head start.

Upon studying the present documents, the skilled person will understand that, upon a L1 miss, a corrective action has to be made in order to get the answer to the CPU. In embodiments, this may be the logic for writing a first write pass. It may be used to write information previously stored in the fetch address register into, e.g., an L1 directory, regardless of the response time of the higher hierarchy level entity. In embodiments, a second write pass might be needed in order to capture the received data into the, e.g., L1 directory at the time of the response.

In an embodiment, the request is sent, not using a fetch address register, as would be usual, but, merely, using a directory structure of the respective cache level. Thus, expensive register structure might be saved.

It might be noted that one or more of the caches might comprise a set predict array or equivalently, a set predictor logic. The set predictor logic may be arranged for providing a predicted set selection for selecting a set in the cache.

A set predictor may have an advantage in that, when access to a memory address is required, usually, a tag part of the memory address is issued to the comparators of an associative cache. In relation to a main memory, the tag part might be considered to represent a beginning of a memory page, whereas an index part of the memory address might be considered to represent memory addresses from within a main memory page. The comparators will then compare the tag part of the required memory address with all the stored tags, thus providing an associative cache. Data of the cache will be output, if a corresponding tag and matching index is found—the index corresponding to a set in the cache. Such comparisons may be costly in time.

The set predictor logic may provide an advantage in that it comprises, for a given tag, a set index, also denoted as ID or "way", where the requested data may be found. In this regard it may be noted that the requested data may be data itself or instruction data.

In embodiments, one or more of the following effects may result: 1. The fetch address registers (FARs) may be designed to be comparably smaller, compared to the first above described approach, which may result in a smaller area on the semiconductor chip carrying the processor. 2. The last recently used, LRU, entry, that is going to be replaced, has to be marked early as being invalid, as the administrative data change at an earlier point of time, compared to the first above approach. 3. For an L2 miss a second write step for the administrative data will be necessary. Though most of the administrative data will already be stored in the directory. First when executing the second write step, the cache entry will be marked to be valid. First then, subsequently, an access to this line may result in a hit.

According to one embodiment, the method might further comprise scheduling a first write pass and writing directory structures of a lower hierarchy level entity to be invalid. This may have the advantage that the memory banks of the respective caches are prepared to receive the new contents, whereas the data is marked to be invalid, so that in a concurrent request from the same or another core the invalid data will not be referenced.

According to one embodiment, the method might further comprise receiving a response from the higher level hierarchy entity.

According to one embodiment, the method might further comprise receiving a response from the next higher level cache. This might occur at a later pipeline stage than the receiving a response from the higher level cache, but does not occur necessarily.

In this regard, according to one embodiment, the method might further comprise scheduling a second write pass for key and valid information of directories in the lower level cache and the higher level cache. This may have the advantage that, after the response from the next higher level cache has arrived, after writing the retrieved data contents to the caches of the different levels, the data is marked valid to be used for current and concurrent processes executed on the processor. The skilled person understands that in a system, that does not use such a key, only a valid bit might be written.

According to one embodiment, the method comprises to be performed on a processor structure, wherein a lower level hierarchy entity may be a first level cache of the processor, the higher level hierarchy entity may be a second level cache of the processor, and the next higher level hierarchy entity may be a third level cache and/or a main memory associated with the processor.

According to one embodiment, the method comprises writing, in the case of a write pass, data into a directory structure to the respective level hierarchy entity instead of writing the data to a register, e.g., a fetch address register. This may have the advantage that a fetch address register may be saved, thus saving memory capacity on the processor's chip. This can be achieved, because, in the moment the data of the next level cache is requested, the corresponding local data of the present level cache is invalid, so that it is possible to re-use the data structure concerning the directory structure of the present level.

According to one embodiment, the method comprises determining, based upon a response from the higher level hierarchy entity, as to whether a hit has been encountered.

In this regard, according to one embodiment, the method comprises, when a miss has been encountered in the higher level cache, and response is received from the next higher level cache, writing only key and valid information.

In an embodiment, a method is considered, the method specifying how to operate different processor cache levels for a processor with pipelined execution. In one embodiment, a likely cache miss for a lower level cache might be detected early in the pipeline, however, a cache hit in a higher level cache might only be detected late in the pipeline. In an embodiment, this might have a consequence that a directory write pipe pass for the lower level cache to obtain data from the higher level cache must be scheduled regardless of the outcome of a cache lookup for the higher level cache.

In this regard, according to an embodiment, when no cache hit is predicted for the lower level cache, a first write pipe pass might be scheduled, for invalidation of directory entries in the lower level cache and the higher level cache. According to an embodiment, a fetch request might be sent to a next higher level cache.

In this regard, according to an embodiment, when a response answering the fetch request, the response being sent by the next higher level cache, is received, a second write pass for key and valid information of directories in the lower level cache and the higher level cache might be scheduled.

In an embodiment, the lower level cache may be a first level cache, the higher level cache may be a second level cache, and the next higher level cache may be a third level cache.

Herein, a new solution, e.g. concerning a data structure, for an L1/L2-cache handling of miss events is introduced. A solution may be proposed, that may save fetch address register bits, FAR bits, and comprises a new algorithm for a write process that might be denoted as an "early" write process. A different use of a cache directory respectively an adapted flow, i.e., no more storing of fetch addresses, may be implemented, based on the findings set forth herein. As the FARs point to congruence classes, per congruence class, multiple FARs can be used.

To summarize, in a deeply pipelined processor design, latency is a significant concern. In a case of a cache miss, reloads from the next level cache must be speculated and the cache and directory write requests may be entered into the pipeline long before the exact details of the cache miss may be known.

Herein presented is a method to reuse write cycles even when cache misses must be resolved by accessing farther away caches.

As presented herein, partial directory information may be written to the cache directory ahead of time. For example, before the full details of the response are known.

Thus, an advantage may be provided in that a significant amount of registers may be saved that are otherwise needed to store the partial information.

Present disclosure may be understood to organize for the updating of the information to achieve a consistent and correct cache state.

According to another aspect, a processor is provided, the processor having at least a one cache, the cache comprising at least a directory structure for keeping entries written into a memory bank of the cache, and at least a fetch address register, wherein parts of the directory structure are arranged to, at least partially, fulfil a task of the fetch address register.

In the above processor, the directory structure may comprise a) bookkeeping logic for keeping book about which entry is stored and b) the stored data itself. In other word, both a directory, i.e. bookkeeping on which lines are stored, and the data, i.e. the copy of the memory data, may be comprised.

In an embodiment, the processor may be arranged to execute any combination of the method steps described above.

According to another aspect, a computer program product to operate different processor cache levels of a cache hierarchy for a processor with pipelined execution is provided, the cache hierarchy comprising at least a lower hierarchy level entity and a higher hierarchy level entity, the computer program product comprising a computer readable storage medium having computer usable code embodied therewith, wherein the computer readable storage medium is not a transitory signal per se, the computer usable program code comprising: computer usable code configured for sending a fetch request to the cache hierarchy; computer usable code configured for detecting a miss event from a lower hierarchy level entity; computer usable code configured for sending a fetch request to a higher hierarchy level entity; and computer usable code configured for scheduling at least one write pass.

The present disclosure may be a system, a method, and/or a computer program product. The computer program product may include a computer readable storage medium (or media) having computer readable program instructions thereon for causing a processor to carry out aspects of the present disclosure. While the above paragraphs use the phrase "according to one embodiment," it should be noted that these embodiments are not necessarily mutually exclusive, and as such the features may be combined with each other.

In other words, as a background, requests running into an L1 miss event or an L2 miss event, need tracking structures in the L1 cache. One of the tasks was to reduce the size of these tracking structures.

The reason for the upcome of the aforementioned task is a new pipeline that introduced an auto scheduled write pipe pass.

The solution may be, taking advantage of auto scheduled write pipe pass, that may be scheduled after a fixed number of cycles, e.g., with respect to a L1miss pipe pass, or, in other words, with regard to a fixed access cycle. This is needed for a situation of an L1-miss/L2-hit as well as for a situation of an L1-miss/L2-miss, by storing some data from tracking structures already in directories.

The computer readable storage medium can be a tangible device that can retain and store instructions for use by an instruction execution device. The computer readable storage medium may be, for example, but is not limited to, logic implemented on a semiconductor chip, as, e.g., a storage medium for comprising microcode instructions for the internal logic of a processor chip, a Field Programmable Gate Array (FPGA), an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a cache, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, or, equivalent to a programming language applied to control a processor chip's hardware behaviour, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In embodiments, a processor may comprise a cache. A "cache", as is used herein, refers to a specific kind of computer memory, in particular a hardware memory that is used by a central processing unit (CPU) of a computer to reduce the average cost (in time) to access data from a main memory. Such cache may be a faster, smaller memory, i.e., faster and smaller compared to the main memory, that is arranged relatively close to a core of the processor which may store copies of the data from one or more frequently used main memory locations. The cache may be arranged directly on the semiconductor chip whereupon the processor core is implemented or may be arranged communicatively coupled to the CPU. A cache may be part of a cache hierarchy comprising multiple levels, i.e., a so-called L1-cache may be arranged most closely to the processor's core, an L2-cache might be provided that is arranged downstream from the L1-cache when seen from the core, and, an L3-cache might be provided downstream from the main memory. The L1-cache, that is closest to the core, may be very small, very fast, very expensive, and relatively high energy consuming.

Further, a cache may serve different purposes. For example, in embodiments, an instruction cache, sometimes also denoted as "I$", might be arranged for keeping the processor instructions most recently fetched from the main memory. This may have an advantage of keeping code, as for e.g. loops, close to the core so that the instructions may be transported without or almost without any latency towards the core. In another example, a data cache might be arranged for. A structure and control logic may differ between an instruction cache and a data cache, because, usually, instructions will not be modified, whereas, when modifying data and storing the data into the main memory or even intending to write them to the disk, a risk of possibly inconsistent states between the data in the data cache and the data in the main memory has to be taken care of. This means, the instruction cache serves speeding up instruction fetches, the data cache serves speeding up fetch and restore with regard to the main memory or, at least, a next-level cache.

In the following, "data" will be used to generically denote "data" or "instructions" unless the content requires otherwise.

If not specified otherwise, "cache" is used for a cache of any of the cache-levels. If not specified otherwise, "memory" may also mean "the next higher level" cache, in order to keep the description readable.

Data may be transferred between main memory and cache in blocks of fixed size, called cache lines or cache block. When a cache line is copied from main memory into the cache, a cache entry may be created. Such cache entry may comprise the copied data and a so-called "tag". A "tag" as referred herein denotes a part of the main memory address of interest. Data may be marked to be valid or not by maintaining a "valid flag" for each set.

A further part of the main memory address of interest may be denoted as "index" and may be directly associated with an access unit within the cache. A further part to be used as part of a memory address, e.g. an offset, is considered. Thus, the main memory may be regarded as structured—when seen from the cache—in blocks of fixed size, wherein each block begins at the main memory address that is defined by the tag plus following zeros. The size of each block is then defined by the power of two of the sum of the index bits plus the offset bits, if any.

When trying to load data from cache, two distinct events may occur: Either a cache hit happens—in this case, the associated data might be loaded into the CPU. Or, a cache miss happens—in that case, a relatively expensive access to a higher level and more slowly memory may be tried.

In the case, the cache is a data cache, having the task also to buffer write accesses to memory, different write policies are considered, as for, e.g., "write-through", meaning immediately writing the modified data to memory, or "write-back", meaning that the data is only written, when it is tried to fetch it. For keeping track of the difference between the valid data in the cache and the invalid data in the memory, an additional flag is provided, the so-called "dirty flag".

A cache may be embodied differently according to associativity. A so-called direct-mapped cash exhibits zero associativity: When each entry in main memory can be placed into one unique place in the cache only, exhibiting good answer times in best cases but very long times in a worst case. On the other hand, at the other extreme, a fully associative cache allows the data to be placed anywhere in the cache, providing the best miss rates, but relatively expensive because of the large number of comparators needed.

As the skilled person might be aware of, a medium associativity may be thrived for, e.g., a 2-way associative cache. In such a case, an m bit memory address might be partitioned as a left part of the m-s-1 left bits for the tag, the most right standing bit for the offset, and s bits for the index. In embodiments, a 2-way associative cache may be considered, but direct-mapping and higher associativity are considered, too.

An instruction pipeline, in an embodiment, is a means for implementing a form of parallelism, i.e. instruction-level parallelism, within a single processor. As a result, faster CPU throughput is provided, i.e. the number of executions that can be executed in a unit of time than would be otherwise possible at a given clock rate. A basic instruction cycle is broken up into a series called a pipeline.

For example, a basic five-stage instruction cycle might comprise steps of: instruction fetch (IF), instruction decode (ID), execute (EX), memory access (MEM), register write back (WB). These steps may be broken down, so that, in one clock cycle, different stages of instructions may be executed, only as an example: While a first instruction is almost finished and might want to write a result to memory, a second instruction might be executed, whereas a third instruction is just being decoded and a fourth instruction being fetched from memory, all in one and the same clock cycle. Thus, as the skilled person is aware of, overall execution may be relatively fast. Embodiments consider different stage numbers in a pipeline.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A block diagram illustrating an example computer processing system adapted to implement the methods of the present disclosure is shown in FIG. 1. The computer system, generally referenced 1, comprises a processor 2 which may comprise a digital signal processor (DSP), central processing unit (CPU), microcontroller, microprocessor, microcomputer, ASIC or FPGA core. The processor 2 may comprise a cache 2A, that might be an instruction cache or a data cache or two caches serving as instruction cache, data cache, respectively. The cache 2A may be a first level cache or L1-cache.

The system may also comprise static read only memory 7 and dynamic main memory 6 and may also comprise a FLASH memory 5. Further, the system may comprise a higher-level cache, e.g., a second level cache or L2-cache or a third level cache or L3-cache. It is considered to have a higher level cache between the processor and any further memory device. It is also considered to have the L1-cache 2A directly connected to a core (not shown) of the processor and the higher-level cache 2B directly on the processor, to be shared between the different processor's cores. The processor 2 may be, via a bus 3, in communication with any of said memory devices as well as with peripheral devices such as a display device 10, a keyboard 9, a pointing device 8, such as, e.g., a mouse or a tablet.

In embodiments, the computer system may be connected to one or more external networks such as a LAN or WAN or SAN 12 via communications lines connected to the system via one or more data I/O communication interfaces 11, e.g. a network interface 11. The network adapters 11 coupled to the system enable the data processing system to become coupled to other data processing systems or remote printers or storage devices through intervening public or private networks. Modem, cable modem and Ethernet cards are just a few of the currently available types of network adapters. The system comprises also a magnetic or semiconductor based data storage or storage device 4 and/or 13 for storing application programs and data. The system comprises computer readable storage medium that may include any suitable memory means, including but not limited to, magnetic storage, optical storage, semiconductor volatile or non-volatile memory or any other memory storage device.

Figure 2:
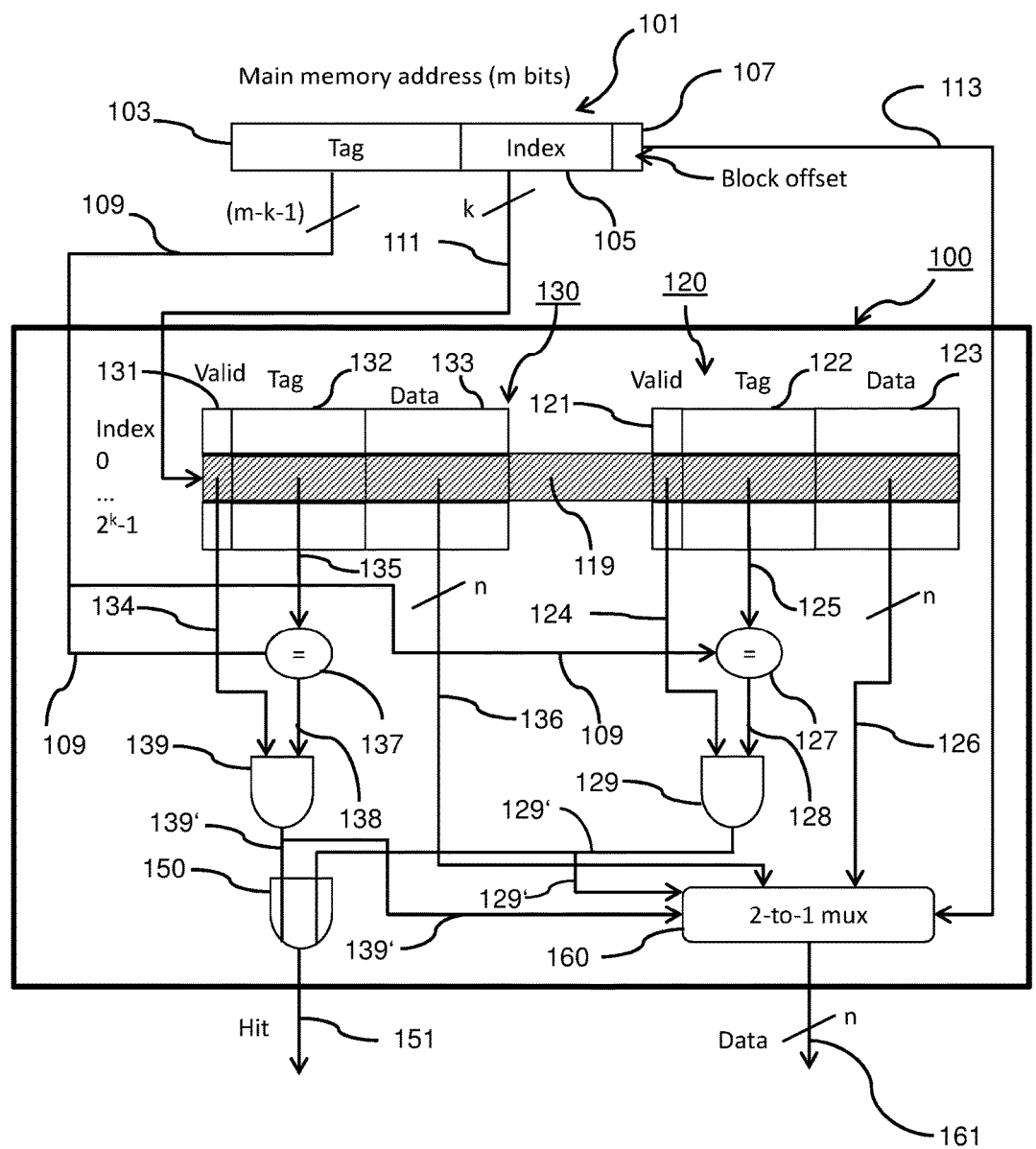
FIG. 2 shows a simplified block diagram illustrating an example 2-way set associative cache implementation.

A simplified block diagram illustrating an example 2-way set associative cache implementation adapted to implement the methods of the present disclosure is shown in FIG. 2.

A 2-way set associative cache may be depicted by reference numeral 100. The selection of a 2-way set associative cache is not intended to limit the scope of the disclosure. Also higher associative caches are considered. However, for the sake of readability and as example only, herein, a 2-way associative cache is referred to. The skilled person will easily understand that the data that is to be fetched may be instructions, i.e. instruction data, or data as such, without limiting the teaching set forth below.

A main memory address 101 being defined by, e.g., m bits, may be partitioned into a tag 103 consisting of the left (m-k-b) bits, an index 105 consisting of the following k bits and a block offset 107 having b bits, which control the alignment of fetched data within a cache line. Finally, in order to achieve associativity, a set may be selected based upon a tag compare, as shown below with regard to tag comparators, identified by reference numerals 127 and 137. This may be, because a nature of set associativity may be that any address of the relevant congruence class can be stored in any set. The offset may be used to select a fraction of a line, as denoted by reference numeral 113 as discussed below. In this regard, the figure may be understood as merely outlining the functionality of a cache, in an embodiment, without intending to limit the scope of the disclosure of the present documents.

Numeral 100 depicts the two-way set associative cache. Tag 103 is fed via tag line 109, index 105 is fed via index line 111 and the block offset 107 is fed via block offset line 113 into the cache 100.

The cache 100 further comprises two memory banks 120 and 130. The structure of the two memory banks can be considered as identical, so that the following discussion concentrates on memory bank 120, wherein it is to be understood that similar numerals refer to similar entities and similar if not identical functionality.

Memory bank 120 consists of several columns and several lines. The columns are a valid flag 121 identifying as to whether the corresponding data 123 is valid or not, a tag column 122, and a data column 123. The width of the data may be n bits. The width of the tag column 122 is the same as the width of the tag 103, i.e., (m-k-1).

The memory bank 120 consists of $(2^k)$ lines, corresponding to the address room of the index 105.

Via line 111, carrying the index value 105 from the main memory address 101, a line 119 is selected in both memory banks. Such line 119 may also be referred to as "set", or, as the skilled person will understand, as a congruence class, that comprises at least all the data values 123 and 133 of the selected line, that is selected via the index 101.

Memory bank 120 provides a line 124 for outputting the value of a selected valid flag of column 121, a line 125 for outputting the tag value, and a line 126 for outputting the data value of column 123.

With the help of comparator 127, the tag value 109 of the required main memory address 101 may be compared to the tag value 125 from the index selected tag column 122. If both tags are identical, the comparator 127 sends via line 128 a logical "1" to AND-gate 129. Also, the corresponding, index selected value of the valid column is sent, via line 124, to the other input of the AND-gate 129. If both input lines 124 and 128 are on a logical "1", also the output 129' of the AND-gate 129 will be a logical "1". As the output 129' of the AND-gate 129 establishes an input line of an OR-gate 150, the cache 100 will output on line 151 a logical "1" meaning a "cache hit".

The skilled person understands that the same functionality is performed by memory bank 130. Further, it is considered that only one column for the "valid" flag, e.g., column 131, and only one column for the "tag", e.g., column 132, may be necessary, the corresponding columns 121 and 122 being omittable. Thus, it is considered to have only one memory bank having columns 131 and 132 for validity and index selection, and columns 133 and 123 for the data values.

When, in this way, it has been found out that there is a cache hit, it is necessary to decide which data, or block, of the two memory banks has to be transferred to the CPU or, the core. In the case, only a part of the cache line is to be read out, this may be achieved by evaluating the individual signals 129' and 139' originating from the outputs 128, 138 of the comparators 127, 137, to form the input of multiplexer 160, i.e., a 2-to-1 multiplexer 160. Based upon the hit signal, the multiplexer 160 selects one of the data signals 136 from data column 133 or data signal 126 from data column 123. It is to be noted that, as both data values are already index selected, the correct data may be transferred via cache output 161 towards the CPU or core. In embodiments, another multiplexer, for a better ease of understanding also denoted by reference numeral 160, controlled by the block offset 107 transmitted via line 113, may be present that reduces the amount of data stored in the data column 123, 133 to a width suitable to be consumed by the CPU via output 161.

For the reason of clarity, CPU and core are not depicted herein.

To summarize, the main memory address 101 is partitioned or split into several parts, that serve different addressing functionality. In this regard, the main memory may be regarded as being split up in $(2^{(m-k-b)})$ memory blocks, each having $(2^b)$, e.g., bytes or words.

In the case, no "hit" is found, a necessity arises to fetch the data and/or instruction from the next memory hierarchy level, be it an L2 cache, an L3 cache or the main memory itself. Such situation may also be denoted to be a "miss".

When a "miss" occurs, the data to be fetched has to be requested from the next hierarchy level of memory. For tracking this event, logical circuitry is provided on the processor. This logical circuitry may comprise control logic having counters, flags and registers for keeping track with hits and misses and status information concerning actual fetched data and/or instructions with respect to the L1 instruction cache. In particular, information that had been stored in a fetch address register, may then be written into a directory associated with and describing the actual contents of the L1-cache. This may have a disadvantage because a register is a relatively expensive resource.

Figure 3:
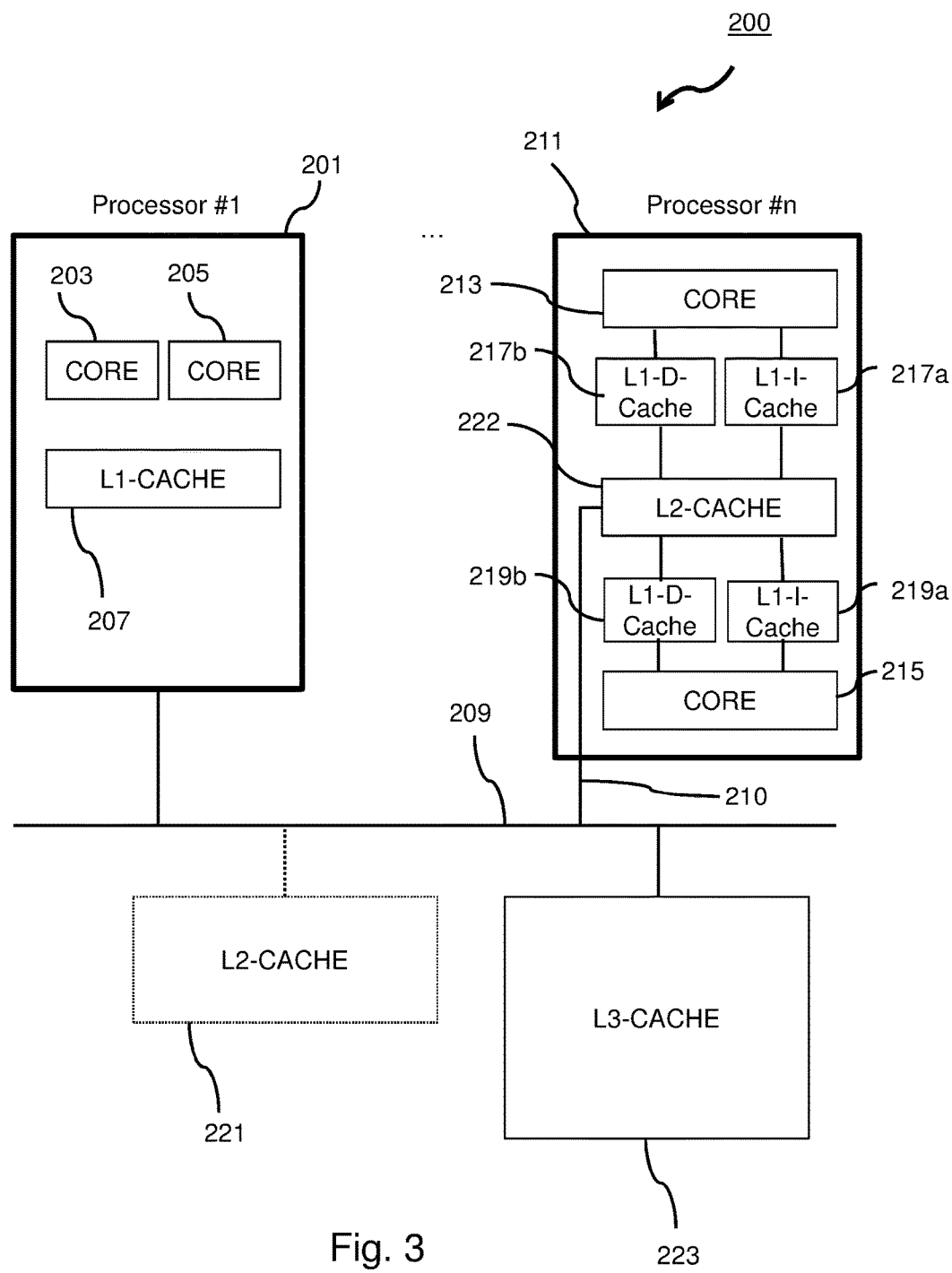
FIG. 3 shows an example of a computer system.

An example of an embodiment within a computer system 200 is exemplarily depicted in FIG. 3.

Computer system 200 comprises at least one processor 201 having one core 203 and one L1-cache 207, i.e., a cache of a hierarchy level 1. It is considered to have an additional core 205 within processor 201 sharing the same L1-cache 207. It may be also considered to have one L1-cache for each processor.

Further, computer system 200 might comprise at least another processor 211 having at least one core 213, possibly one or more further cores 215. Each core may be provided with one or more L1-caches, i.e., core 213 may be provided with a Level-1 instruction cache, L1-I-cache, 217a, and a Level-1 data cache, L1-D-Cache, 217b. It may be advantageous to have L1 data cache and L1 instruction cache separated, because, e.g., instructions, that are not going to be changed, and data, that is prone to be changed, require different handling with respect to the main memory. Further, as instructions and data will be arranged at different sites in the main memory, to fulfil a principle of locality, it may be advantageous to have local instructions in one L1-cache and local data in another L1-cache, in order to gain a higher hit-rate. A core 215 may be provided with a Level-1 instruction cache, L1-I-cache, 219a, and a Level-1 data cache, L1-D-Cache, 219b.

The L1-caches 217a, 217b, 219a and 219b may share an L2-cache 222 that may part of processor 211, i.e., be implemented of the same chip or die of processor 211. L2-cache 222 may be communicatively coupled, via a line 210, to bus 209.

The computer system 200 may be comprised of similar or different processors.

The processors 201 and 211 might be in communication with a bus 209, analogously to an arrangement as depicted in FIG. 1. A further cache of a higher level, e.g. an L2-cache 221 might be communicatively connected to bus 209, as well as a further cache of a further higher level, e.g. an L3-cache 223, might also communicatively connected to bus 209. The L2-cache 221 is depicted as a punctuated line because, in modern processor architectures, an L2-cache is more likely to be found on the processor than as a separate memory.

Figure 4:
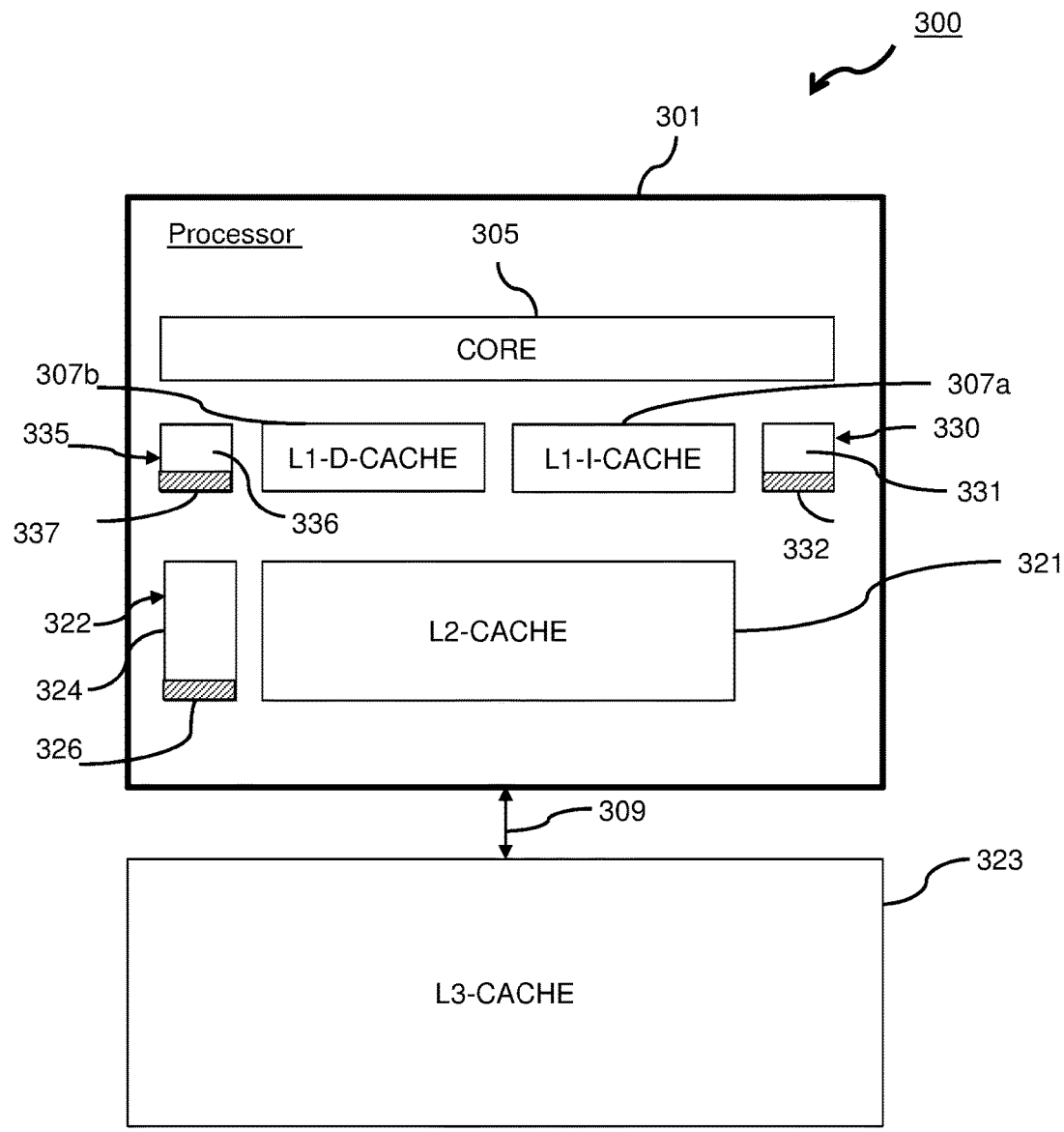
FIG. 4 shows an exemplary cache hierarchy.

From a mere logical point of view, in an embodiment, a cache hierarchy 300 might be outlined as depicted in the block diagram of FIG. 4.

A processor 301 may comprise at least one core 305 that is coupled to an L1 instruction cache 307a and an L1 data cache 307b on the same chip.

L1 instruction cache 307a may be provided with logic circuitry 330. The logic circuitry 330 may, under reference numeral 330, comprise control logic having counters, flags and registers for keeping track with hits and misses and status information concerning actual fetched instructions with respect to L1 instruction cache 307a.

As an example, logic circuitry 330 might comprise one or more fetch address registers, FARs, 332—in this case instruction fetch address registers. The circuit logic circuitry 330 may, under reference numeral 331 denoting functional logic and registers, comprise a directory describing the contents of the L1 instruction cache 307a. The logic circuitry 330 may, by means of 331, be able to gather statistic data concerning the hits and misses in order to check, whether certain thresholds are exceeded or undershot. Further, the logic circuitry 330 may, by means of 331, be able to predict the next main memory address that might get needed by the core. In other words, logic circuitry 330, by means of 331, makes a guess as to which instruction or which instructions might be tried to be fetched next. Based on this guess, circuitry 330, by means of 331, may be able to issue a fetch directed to the guessed address. Circuitry 330, in regard of 331, may be optimized for supplying the core with instructions. In order to keep readability of the figure, the detailed internals and signals of the circuitry 330 in relation to the further components on the processor are omitted here.

The skilled person will appreciate that the logic circuitry may be concentrated on a confined area on the processor's chip, or, alternatively, be distributed over the chip in a manner appropriate for fulfilling its respective tasks.

The L1 data cache 307b may be equipped with a logic circuitry 335 that works similar to logic circuitry 330, logic circuitry having an inner structure established by the reference numeral 336 and FAR 337, and that may be optimized in regard of the specific tasks of a data cache.

Though the FAR or FARs 332 for the L1 instruction cache and the FAR or FARs 337 for the L1 data cache are depicted to be arranged within the logic circuitries 330, 335, respectively, it goes without saying that all FAR on the processor chip may be localized close to the core's registers. Herein, the logical interdependence of the FAR in relation to the respective caches on the processor is to be set forth.

Further, the processor 301 may comprise one or more L2-caches 321 that may be shared between all the L1-caches on the chip. L2-cache 321 may be equipped with a logic circuitry 322 that comprises functional logic and registers analogous to what is already described in regard of reference numeral 331 and one or more FAR 326. The circuitry 335 may be roughly similar to the logic circuitries 330 or 335, whereas logic circuitry 322 along with FAR 326 might be optimized in regard of the tasks of an L2-cache. The skilled person will understand that L2 might be established by several completely separated instances, as for, e.g., one L2 cache for instructions and one L2 cache for data.

The processor may be communicatively coupled to a bus 309. The L2-cache 321 may be communicatively coupled to bus 309 to an L3-cache 323.

The skilled person will understand that a cache logic unit may be provided that rules that any communication between the respective cache levels only occur between subsequent levels of the cache hierarchy, and, further, that inhibits any access to a cache that is not in accordance with a policy ruling the caches.

In embodiments, all required information concerning, in regard of instructions to be fetched, e.g., logical address of, absolute address concerning fetches are stored in the FAR or FARs 332. The skilled person will understand that the mechanism described in the following in regard of instructions to be fetched is also applicable on data to be fetched. For a better readability, however, in the following, it will only be referred to the instruction fetching parts of the processor, though the same holds for the L1 data cache as well as for the L2 cache. Further, in the following, it will be referred to the FARs 332 in the plural form without intending to narrow the scope of protection.

Once, a response comes back from an L2 cache or an L3 cache, the fetched address may be stored and/or fetched into the directory structure accessible in the circuitry sub-component 331 instead of maintaining the fetched address in the FARs 332. This may have the advantage that the registers, that are a valuable resource in a processor, may be used more economically, or, area on the silicium chip may be saved. The response from the higher level cache makes the fetched address accessible in L1 cache 307*a*.

A significant portion of data that had been usually stored in FARs may, in embodiments, be stored into a directory on a first write pipe pass. Such directory entries may be left marked not-valid. One reason for maintaining such directory entry not-valid may be that the L3-cache has not returned data yet.

Next, due to different response times from an L2 or L3 cache, an immediate write pipe pass may be required for L2 resolution. In this regard it might be noted that an L2-hit/-miss outcome is not known in time to suppress this immediate write pipe pass for an L2-miss case.

Next, when the response from the L3-cache returns, a second write pipe pass may be scheduled.

As an effect, apparent savings with regard to a FAR may be achieved. For example, having a logical address of m bits, (m-k-b) bits are only used as a tag for a directory lookup and are not needed to handle the outstanding response from the L2 or L3 caches. Likewise, the cache directory may comprise an absolute address as part of the tag to be matched on the lookup compare that is also not required to process the L2 or L3 response. However, this data has to be kept in the FARs 332 to perform a consistent update of the state of the L1 directory 331 as described earlier. The savings achieved could be the (m-k-b) tag bits and the number of bits per absolute address in each of the implemented FARs 332. The concepts of logical address, virtual address and absolute address are known to the skilled person and, thus, will not be repeated here.

As a background, it might be noted that a cache entry consists of load data, i.e. copy from main memory, and administrative data. The administrative data are necessary in order to recognize, which segments of the main memory are store in the cache. In the case, a cache access results in an L1 miss/L2miss, L1 may require the required data from a higher level cache or main memory. It is considered to replace a cache entry, that has not been used for a longer while. This scheme may also be referred to as least recently used, LRU scheme.

It is considered, that the administrative data may be stored in the FAR, until a response on the request arrives at the L1. First then the complete administrative data may be written into the cache directories.

In embodiments, alternatively, it is considered that already at the point of time of the L2miss, a large amount of the administrative data may be written into the directories.

The alternative approach may exhibit one or more of the following three effects:

1. The FARs may be designed to be comparably smaller, compared to the first above described approach, which may result in a smaller area on the semiconductor chip carrying the processor.

2. The LRU entry, that is going to be replaced, has to be marked early as being invalid, as the administrative data change at an earlier point of time, compared to the first above approach.

3. For an L2 miss a second write step for the administrative data will be necessary. Though most of the administrative data will already be stored in the directory. First when executing the second write step, the cache entry will be marked to be valid. First then, subsequently, an access to this line may result in a hit.

A disadvantage of this embodiment might be that an L1 entry has to be immediately chosen to store parts of the contents of the FARs 332 in the L1 directory 331. There is a risk that old L1 entries might have been useful, i.e., accessed, until a long running L3 miss is resolved. Embodiments may choose to select the to be replaced L1 entry only at the L3 response time. This is to be seen in relationship with having only a limited associativity in the L1 cache.

Figure 5:
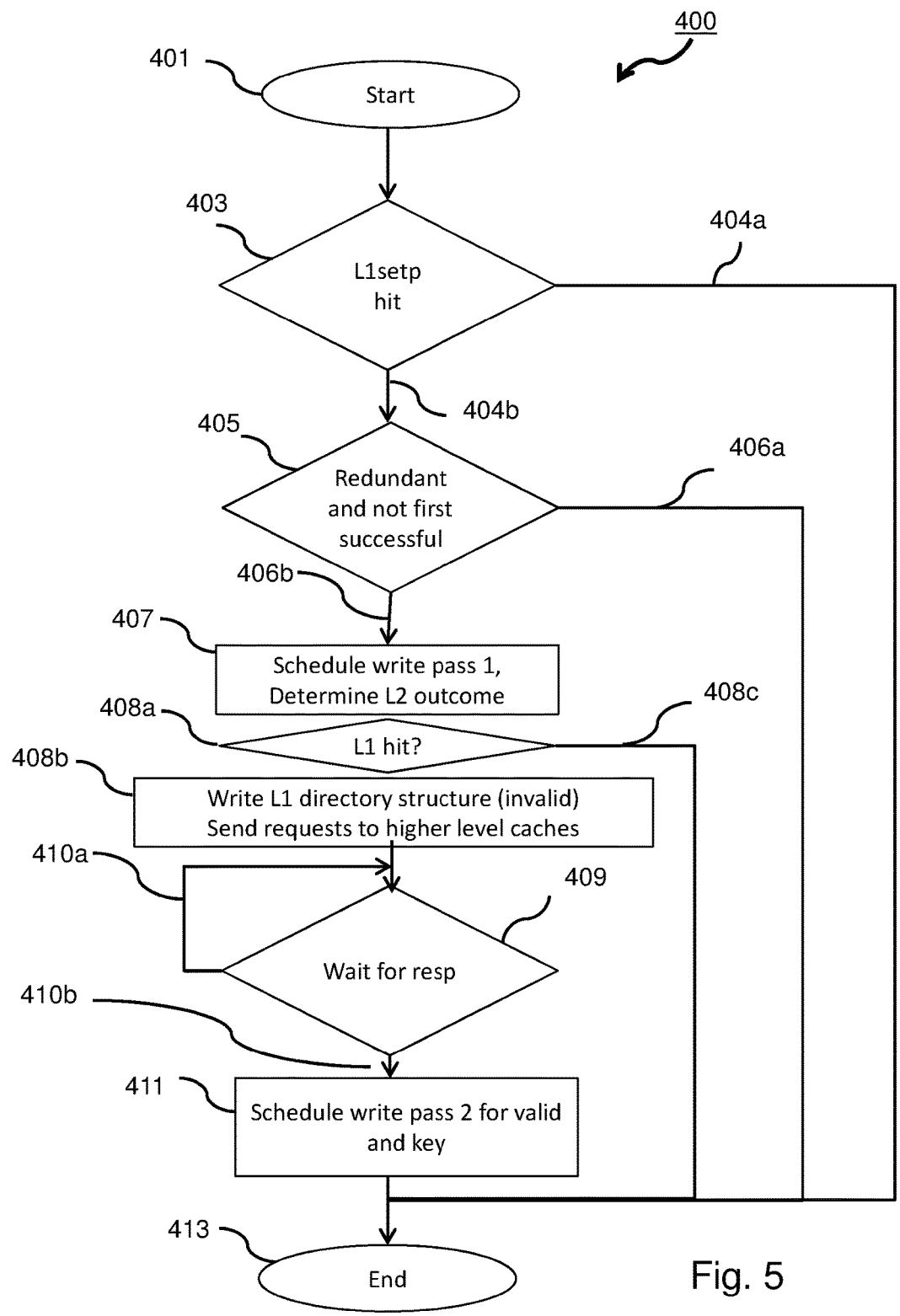
FIG. 5 shows a flow chart of a method described herein.

FIG. 5 depicts an embodiment illustrating a flow chart of a method 400.

In step 401, start, the method begins.

In step 403, it is determined if the requested data and/or instruction has been found in an L1-cache. In the case, the requested data has been found, i.e. a "hit" has occurred, the methods branches via path 404*a* towards the end 413. In the case, a "miss" has occurred, it may be necessary to try to fetch the data from a memory of a higher level—in this case the method branches via path 404*b* towards decision caret 405. The decision performed in step 403 may be including the result of a set-predictor for reduced latency or can be the hit indication 151 of FIG. 2.

In decision caret 405, it is determined whether the fetch access might be redundant and is found to be not first successful. If this is the case, the method may continue via branch 406*a* and end. If not, the method continues with action 407, comprising scheduling a write pass 1, writing the associated directory structures to be invalid and, finally, sending the request to the higher level cache. Step 405 takes care of a pipelined implementation of the L1 cache which may result in multiple fetch accesses to encounter the same miss. Special circuitry in the FARs 332 allows only one fetch towards the higher level cache for a given data element at a time. Step 407 speculates on a faster L2 hit outcome and sets up the L1 directory 331 to accommodate the new data element. I.e., in step 407, an L2 outcome may be determined. This write pass 1 directory update handles both cases of an L1 directory correction or L2/L3 request going out. If final determination of the L1 outcome is known, the L2/L3 request is sent. In embodiments, in a decision caret 408, it may be determined, as to whether an L1 hit has been encountered. If yes, the method may continue, via 408*c*, at 413 and end. If not, in step 408*b*, the L1 directory structure may be written invalid, and requests to higher level caches may be sent.

Decision caret 409 symbolizes a loop, waiting for a reply from the L3-cache. Branch 410*a* may be taken, until a reply from the L3-cache has arrived: In that case, the method may continue with action 411, scheduling write pass 2 for valid and key.

Finally, in step 413, the method may end.

In an embodiment, a method is considered, the method specifying how to operate different processor cache levels for a processor with pipelined execution. In one embodiment, a likely cache miss for a lower level cache might be detected early in the pipeline, however, a cache hit in a higher level cache might only be detected late in the pipeline. In an embodiment, this might have a consequence that a directory write pipe pass for the lower level cache to obtain data from the higher level cache, or, to correct the state of the lower level cache directory, must be scheduled regardless of the outcome of a cache lookup for the higher level cache.

In this regard, according to an embodiment, when no cache hit is predicted for the lower level cache, a first write pipe pass might be scheduled, for invalidation of directory entries in the lower level cache and the higher level cache. According to an embodiment, a fetch request might be sent to a next higher level cache.

In this regard, according to an embodiment, when a response answering the fetch request, the response being sent by the next higher level cache, is received, a second write pass for key and valid information of directories in the lower level cache and the higher level cache might be scheduled.

In an embodiment, the lower level cache may be a first level cache, the higher level cache may be a second level cache, and the next higher level cache may be a third level cache.

Herein, a new solution, e.g. concerning a data structure, for an L1/L2-cache handling of miss events is introduced. A solution may be proposed, that may save fetch address register bits, FAR bits, and comprises a new algorithm for a write process that might be denoted as an "early" write process. A different use of a cache directory respectively an adapted flow, i.e., no more storing of fetch addresses, may be implemented, based on the findings set forth herein. As the FARs point to congruence classes, per congruence class, multiple FARs can be used.

To summarize, in a deeply pipelined processor design, latency is a significant concern. In a case of a cache miss, reloads from the next level cache must be speculated and the cache and directory write requests may be entered into the pipeline long before the exact details of the cache miss may be known.

Herein presented is a method to reuse write cycles even when cache misses must be resolved by accessing farther away caches.

As presented herein, partial directory information may be written to the cache directory ahead of time. E.g., before the full details of the response are known.

Thus, an advantage may be provided in that a significant amount of registers may be saved that are otherwise needed to store the partial information.

Present disclosure may be understood to organize for the updating of the information to achieve a consistent and correct cache state.

What is claimed is:

1. A computer program product to operate different processor cache levels of a cache hierarchy for a processor with pipelined execution, the cache hierarchy comprising at least a lower hierarchy level entity and a higher hierarchy level entity, the computer program product comprising:
a computer readable storage medium having computer usable code embodied therewith, wherein the computer readable storage medium is not a transitory signal per se, the computer usable program code comprising:
computer usable code configured for sending a fetch request to the cache hierarchy;
computer usable code configured for detecting a miss event from a lower hierarchy level entity;
computer usable code configured for sending a fetch request to a higher hierarchy level entity;
computer usable code configured for scheduling at least one write pass; and
computer usable code configured for writing, in the case of a write pass, data into a directory structure to the respective level cache instead of writing the data to a fetch address register.

2. The computer program product of claim 1, further comprising scheduling a first write pass and writing directory structures of a lower level hierarchy entity and a higher level hierarchy entity to be invalid.

3. The computer program product of claim 1, wherein the lower level hierarchy entity is a first level cache of the processor, the higher level hierarchy entity is a second level cache of the processor, and a next higher level hierarchy entity is a third level cache and/or a main memory associated with the processor.

4. The computer program product of claim 1, further comprising determining, based upon a response from the higher level hierarchy entity, as to whether a hit has been encountered.

* * * * *